United States Patent
Tyson et al.

[15] 3,643,342
[45] Feb. 22, 1972

[54] DRYER OR HEATER WITH SHIELDING MEANS

[72] Inventors: David Z. Tyson; Edward E. Hunter, both of Akron, Ohio; Willie Herman Best, Columbia, S.C.

[73] Assignee: The Goodyear Tire & Rubber Company, Akron, Ohio

[22] Filed: Aug. 17, 1970

[21] Appl. No.: 64,488

Related U.S. Application Data

[62] Division of Ser. No. 821,413, May 2, 1969, Pat. No. 3,590,495.

[52] U.S. Cl. ............................................................34/48
[51] Int. Cl. ....................................................F26b 19/00
[58] Field of Search....................34/155, 157, 160, 44, 48; 263/3

[56] References Cited

UNITED STATES PATENTS

| | | | |
|---|---|---|---|
| 2,210,869 | 8/1940 | Larson | 49/74 X |
| 2,551,921 | 5/1951 | Arsem | 49/74 X |
| 2,807,096 | 9/1957 | Kullgren | 34/45 |
| 3,231,985 | 2/1966 | Smith | 34/157 X |
| 3,406,954 | 10/1968 | Fannon | 263/3 |

*Primary Examiner*—Carroll B. Dority, Jr.
*Attorney*—F. W. Brunner and Jack M. Young

[57] ABSTRACT

Apparatus for drying or heating a continuous length element, and more particularly a drying apparatus in a machine for impregnating such fiber with a liquid fiber-to-rubber adhesive coating in the manufacture of tires, belting and similar products, wherein the element is rapidly dried at a controlled temperature by flame generated infrared-type heating means while (1) an adjustable shielding means controls heat flow from the heating means to the element, and/or (2) moving a gas stream rapidly over the surface of the element and shielding means to protect the heating means from the flowing gas stream against any adverse effect on the infrared radiation from the heating means and to remove heat products from the shielding means and element.

The foregoing abstract is not to be taken as limiting the invention of this application, and in order to understand the full nature and extend of the technical disclosure of this application, reference must be made to the accompanying drawings and the following detailed description.

10 Claims, 7 Drawing Figures

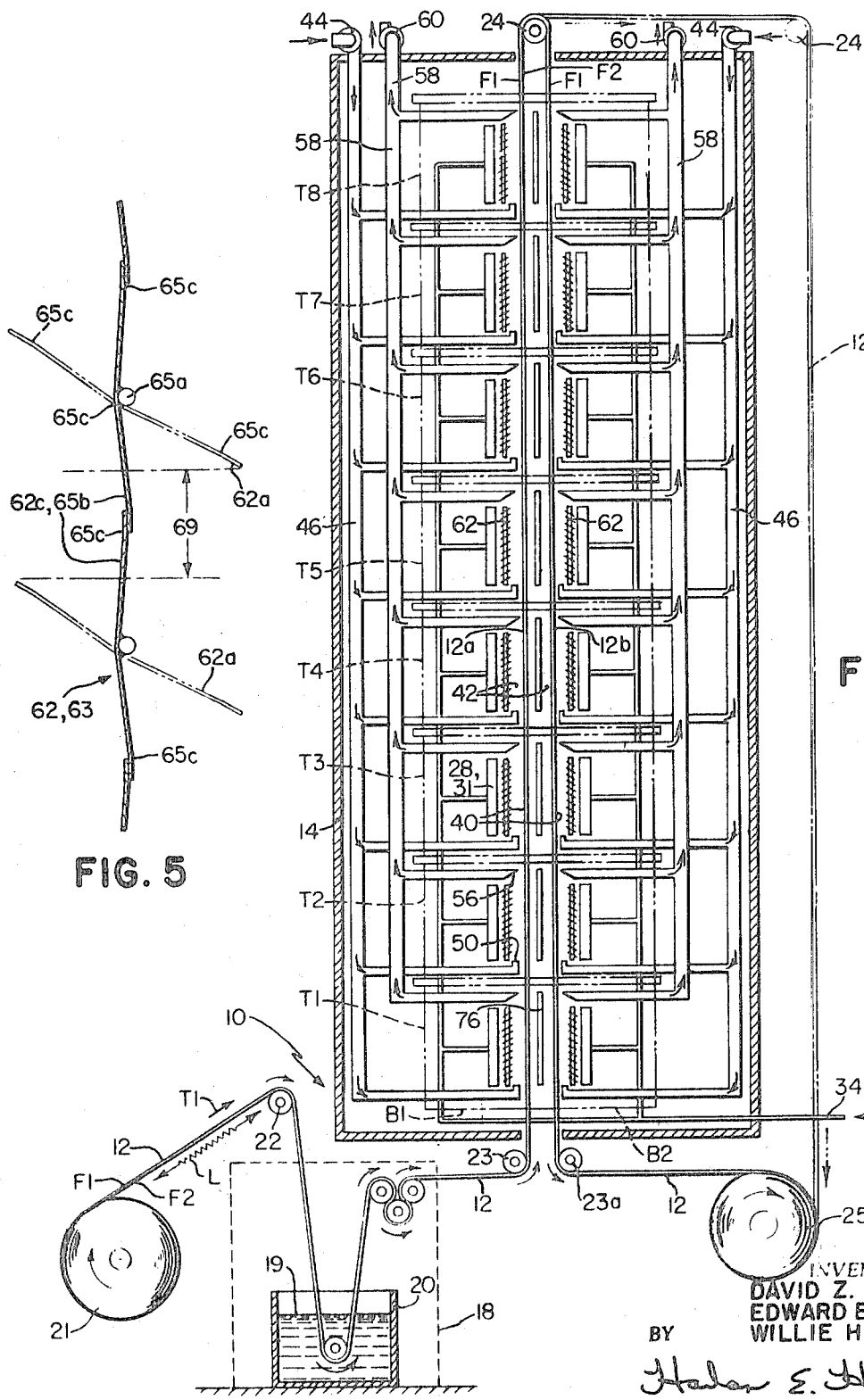

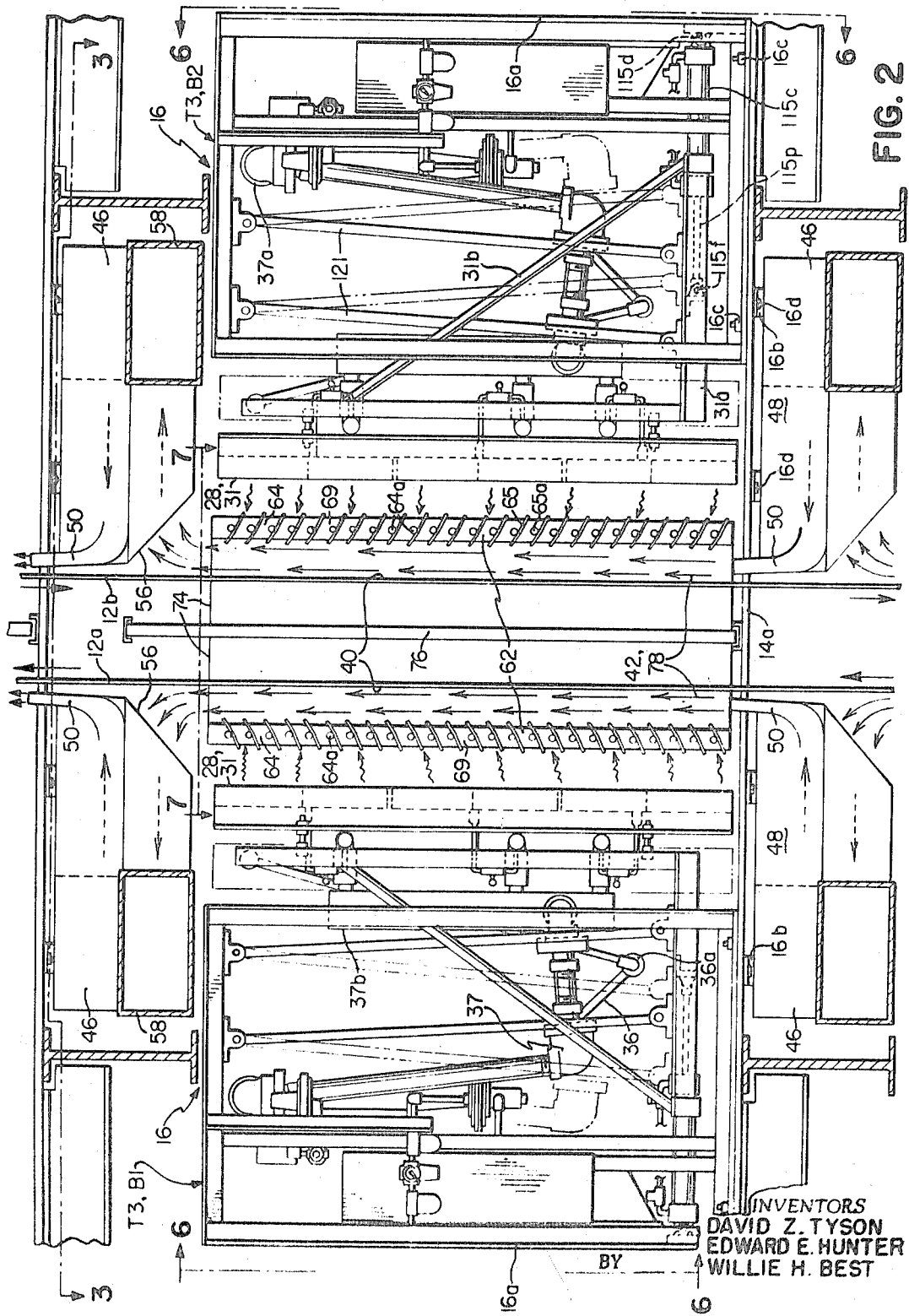

INVENTORS
DAVID Z. TYSON
EDWARD E. HUNTER
WILLIE H. BEST

BY

ATTORNEY

DRYER OR HEATER WITH SHIELDING MEANS

This application is a division of copending application Ser. No. 821,413, filed May 2, 1969, now U.S. Pat. No. 3,590,495, issued July 6, 1971.

BACKGROUND AND SUMMARY OF THE INVENTION

This invention relates to heaters, including dryers, and more particularly to heaters for fibers (whether in yarn, cord, fabric, etc., form), especially such fibers to be used in the manufacture of tires, belting and other rubber products; and to the machine for impregnating such fibers by dipping into a liquid fiber-to-rubber adhesive and subsequently drying the same.

The rubber products industry uses various fibers for reinforcement, including rayon, nylon, polyester, fiber glass, etc., and may use now or hereafter other natural and artificial fibers. The term "fiber," unless otherwise modified, is intended to be used in its generic sense to include all of these fibers. This machine is adapted to process by dipping and drying any continuous length element, such as a woven fabric made up of cord formed of fibers, a yarn made up of fibers before being twisted into cord and woven into fabric, etc. Dipping the yarn is usually done where application of the adhesive over the entire surface of the fiber is desired, such as with fiber glass; while other fibers are dipped in the fabric form. Therefore, the terms "continuous length fiber element," "continuous length element," "fiber element," or "element" used herein, unless otherwise modified, are each intended to cover any continuous length yarn, cord or fabric since each is composed of fibers. The term "fabric" unless otherwise modified, is intended to cover any suitable fabric, including square-woven fabric and including so-called "cord fabric" used for tires and having a fairly open and loose weave wherein the cords form the warp and a comparatively small number of fill threads connect the cords solely to facilitate handling.

It is well known that before any such element made of textile material can be incorporated into rubber articles, especially those to be subjected to drastic conditions of flexing or bending, the fibers thereof must be prepared by coating or impregnating with an adhesive that will bond well to both rubber and the fibers. These adhesives are dispersed, dissolved or suspended in a liquid vehicle, generally water, into which the element is dipped and subsequently dried.

Such elements have been dried by blowing hot air through a drying oven in a relatively low temperature. Because of the low drying temperature and the attendant low speed of operation, large capacity drying ovens have been necessary so as to require vast expenditures of capital and large factory areas for operation. It has been recognized that if such elements could be dried more rapidly, but at a controlled temperature to prevent deterioration of the fiber, the speed of drying could be vastly increased, and/or the size and capacity of the drying apparatus could be considerably reduced.

This invention is an improvement on the invention disclosed in the T. M. Kersker et al. U.S. Pat. No. 3,250,641, granted May 10, 1966, and entitled "Method of Processing Tire Cords, Tire Cord Fabric, And The Like" wherein infrared radiation is used to speed up the drying and many of the problems in such element processing for rubber goods manufacture are explained in some detail to which reference may be had if desired. The dryer must be of sufficient size to dry the adhesive liquid coating sufficiently so that the coating will not be picked off or ruptured by the rolling support means engaged following the drying step.

This invention is also an improvement on the copending U.S. Pat. applications Ser. No. 729,282 entitled "Dryer Or Heater" filed May 15, 1968, now U.S. Pat. No. 3,554,502 by Grover W. Rye and Alexander V. Alexeff and Ser. No. 729,605 filed May 16, 1968, now U.S. Pat. No. 3,521,375 by Dewey C. Sanders, Jr. entitled "Improved Dryer" by the addition of a venetian-blind-type burner flame shielding means to that type dryer with suitable modifications thereof, and the disclosures of those applications are incorporated herein by this reference thereto.

The present invention relates to a machine or to an apparatus for coating, heating and/or drying a continuous length element, and more particularly to a machine for impregnating such element with a liquid fiber-to-rubber adhesive in a coating in the manufacture of tires, belting and other rubber products; or to a heating apparatus wherein the element is heated and heat products are removed from said element and/or heat shielding means therefore by a gas stream rapidly moving over the surface of said element, wherein said heat products are evaporated water molecules for rapidly drying the element at a controlled temperature, or heat when maintaining the heated up element at a controlled or preselected heated temperature, or other products resulting from heating this element; or to a machine used to expose the fibers to the appropriate time and temperature conditions at a preselected temperature in the process known in the art as heat setting, such as used for nylon to give it the desired molecular structure and other characteristics.

An object of the present invention is to provide an apparatus for rapidly and uniformly heating or drying a fiber containing element at a controlled temperature so as to manufacture a maximum quality article by minimum sized equipment.

Another object of the present invention is to provide a method of and apparatus for dipping and drying fibers at a very high temperature and speed without detriment to the fibers or any coating thereon.

Another object of the present invention is to provide an apparatus wherein an element is heated and heat products are removed from said element by a gas stream rapidly moving over the surface of said element and/or heat shielding means therefore, wherein said heat products are evaporated water molecules for rapidly drying the element, heat, or other products resulting from heating this element.

Another object of the present invention is to provide an apparatus for coating, heating or drying a continuous length element rapidly heated or dried at a controlled temperature by flame-generated infrared-type heating means while moving a gas stream rapidly over the surface of the element, protecting the heating means by a shielding means from the flowing gas against any adverse effect on the infrared radiation from the heating means, and/or removing heat from said shielding means by said gas stream.

Another object of the present invention is to provide an infrared heat controlling shutter permitting starting and stopping of the element being infrared heated without damage thereto by controlling the flow of heat thereto.

Another object of the present invention is to provide a shutter for controlling the heat output of an infrared generator by closing a heat-controlling shutter to protect the element being heated when stopped against the residual infrared heat in the generator or to reduce the infrared heat applied to the element.

Another object of the present invention is to provide a machine wherein an infrared heating means is energized and subsequently an infrared controlling shutter is opened to apply quickly, or to increase, infrared heat to the element being heated.

Another object of the present invention is to provide an apparatus having a venetian-blind-type shielding means controlling infrared output from an infrared generator to an element being heated and having a high velocity gas stream traveling between the shielding means and element to remove therefrom infrared generated heat products.

These and other objects of the present invention will become more fully apparent by reference to the appended claims as the following detailed description proceeds in reference to the accompanying drawings.

BRIEF DESCRIPTION OF THE DRAWINGS

In the drawings,

FIG. 1 is an elevational, schematic, vertical view (partially in section) of a machine or apparatus for coating an element and subsequently drying the coated element in a drying tower in either a two-pass element position, as shown in solid lines, or a one-pass element position, as shown partially in solid and dot-dash lines;

FIG. 2 is a side elevational view of two of the heating or drying apparatuses located within the heating or drying tower in FIG. 1, having some parts omitted or cut away, and having opposed heating zones outside faces of the element in a two-pass element position;

FIG. 5 is a vertical sectional view through the shutter slots of the shielding means shown in closed, or more shielding, position in solid lines and in an open, or less shielding, position in dot-dash lines;

DETAILED DESCRIPTION OF THE PREFERRED EMBODIMENTS

Figure 6:
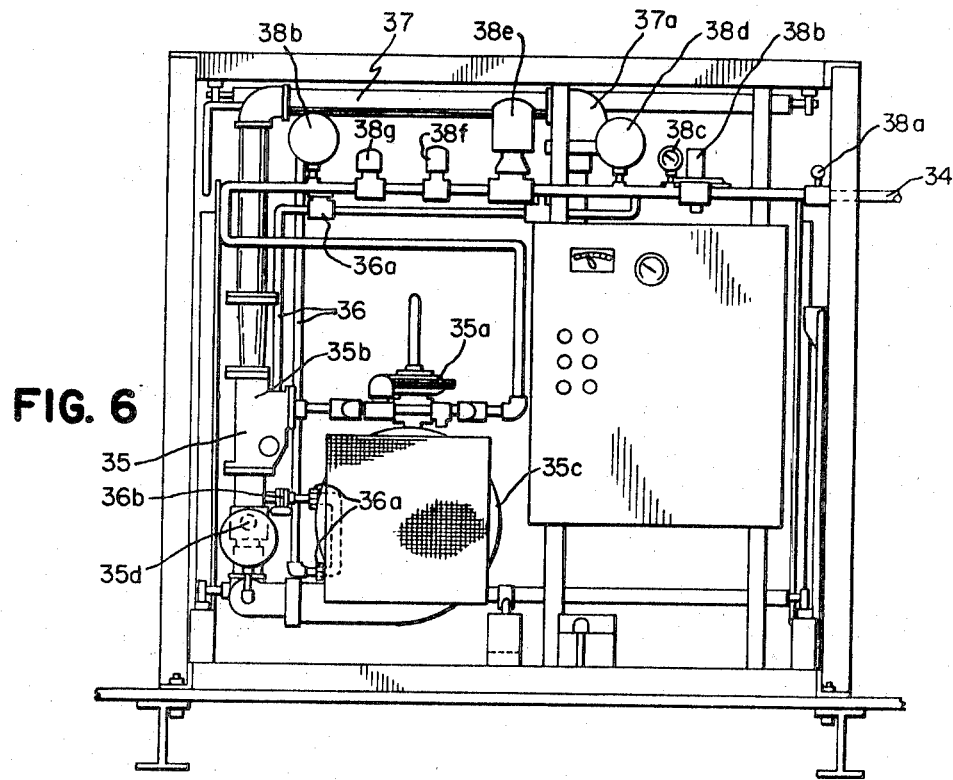
FIG. 6 is a vertical, side elevational view, taken generally along either line 6—6 in FIG. 2, of the fuel flow and other controls for the infrared heaters in one of the apparatuses.

FIG. 1 of the drawings shows machine 10 for treating continuous length fiber element 12 by applying adhesive thereto and subsequently drying the adhesive with machine 10 including heating or drying tower 14 (taking the form of either a separate tower or one zone of an element processing building) having structural members 14a supporting sixteen substantially identical heating apparatuses or dryers 16, to be described in more detail hereinafter.

Machine 10 has a plurality of element processing positions. It may be used in a two-pass element position by having element 12 follow the solid lines as runs 12a and 12b about rolls 23, 24 and 23a to windup roll 25; or may be used in the one-pass element position by having element 12 follow the combined solid and dot-dash line positions as only run 12a over rolls 23, 24 and 24a to windup roll 25. This description will primarily relate to the two-pass element position (having both element runs 12a and 12b) with the one-pass element position (having only element run 12a) being subsequently described with respect to FIG. 3 of the drawings.

Although machine 10 can be used for treating any suitable fiber element 12 (such as yarn, cord or fabric), a woven fabric will be specifically used hereafter in this description with this fabric having a length dimension L along its direction of movement T over drive rolls 22, 23, 24 and 24a or 23a; a width dimension W transverse thereto; and opposite, generally parallel faces F1 and F2.

Since each apparatus 16 is especially adapted for driving moisture out of fibers or fabric, it should be apparent that it has many other uses, such as driving moisture out of woven fabric before calendering in the manufacture of rubber goods.

Although apparatus 16 is specifically described for purposes of illustration herein as a dryer, it will be readily apparent as this description proceeds that apparatus 16 is broadly any type heating apparatus with gas stream 42 (described in more detail hereafter) adapted for removing from element 12 any infrared generated heat products, whether these heat products be evaporated water during drying or heat, such as while rapidly heating element 12 to a preselected temperature and maintaining it at that preselected temperature by the cooling action of stream 42 carrying away any excess heat. "Infrared generated heat products" and "heat products" are defined herein to include water vapor and molecules evaporated from element 12, heat removed from element 12 and/or shutter panel 62 in FIG. 4, evaporated volatiles, and other products resulting from heating element 12 with infrared heat.

Machine 10 in FIG. 1 sequentially moves fiber element 12 in travel direction T from feed roll 21 through coating means 18, through heating or drying tower 14 having 16 heating or drying apparatuses 16 with each having infrared heating means 28, over drive roll or support means 24 with fiber element 12 freely supported between drive rolls 23 and 24 from the bottom or inlet in the heating zones 40 provided by tower 14, and onto windup roll 25 or to subsequent heat treating and/or other processing equipment.

Coating means 18 includes tank 20 containing any well-known fiber-to-rubber adhesive 19 dissolved, dispersed, or suspended in a liquid vehicle. Such adhesive is generally based on resorcinol-formaldehyde resins and latex in an aqueous medium.

Suitable drive means is provided for moving element 12 relative to heating means 28 through machine 10, comprising coating means 18 and tower 14, while each heating means 28 heats element 12 in its heating zone 40. This drive means takes the form herein of suitable tensioning or support rolls 22, 23, 24, and 23a or 24a with any one or all driven by a suitable motor driven drive or independent motors to advance element 12 through machine 10 and to apply suitable tension to element 12. When fabric element 12 has a width W of about 60 inches, 2,000–25,000 pounds tension thereon may be the general operating range for different fibers, and this tension is used for further processing thereof after the adhesive has been dried and for maintaining the fabric taut and planer against lateral deflection and flapping by gas streams 42 mentioned hereafter.

Roller 24 serves as a rolling support means mounted on a rotational axis extending parallel to width dimension W and located in a vertical and planer surface (perpendicular with respect to the drawing in FIG. 1) extending through center walls 76 and between heating zones 40 of two horizontally aligned apparatuses 16 in any given tier, such as tier T3, so that element 12 is trained upwardly in run 12a through heating zone 40 of apparatus 16 in tier T3, bank B1; over rolling support roller 24; and through heating zone 40 of other apparatus 16 in tier T3, bank B2 as a second pass 12b with the outer surface F1 of element 12 being heated in each of these heating zones respectively by the heating means 18 of these apparatuses 16. Vertical runs 12a and 12b of element 12 straddling roller 24 was separated by approximately the diameter of this roller 24 while going through these heating zones 40 with these heating zones 40 in each tier being transversely aligned to the direction of travel of element 12 in opposite banks B1 and B2. Element 12 is sufficiently dried by heating means 28 in bank B1 before engaging roller 24 so that the coating on element 12 will not be damaged or picked off by roller 24 with other heating means 28 in bank B2 finishing drying or other desired heat treating of element 12.

It has been found in practice that drying apparatus 16 in tower 14 manufactures maximum quality element 12 with minimum equipment size.

Figure 3:
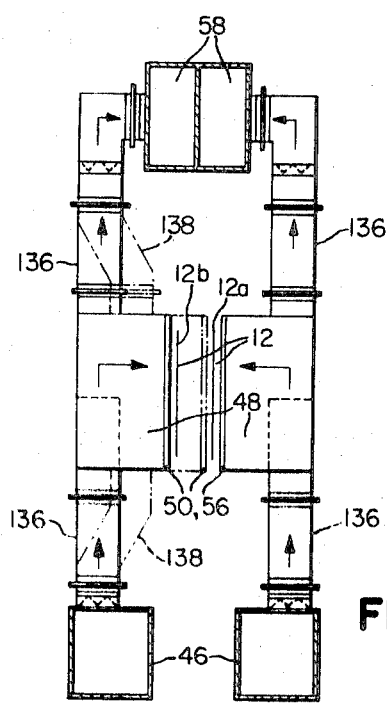
FIG. 3 is a top plan view, taken generally along the line 3—3 in FIG. 2 and turned 180°, showing only the element and the gas moving means for discharging the gas streams into and through the heating zones and subsequently exhausting them from the apparatuses in FIG. 2.
Figure 4:
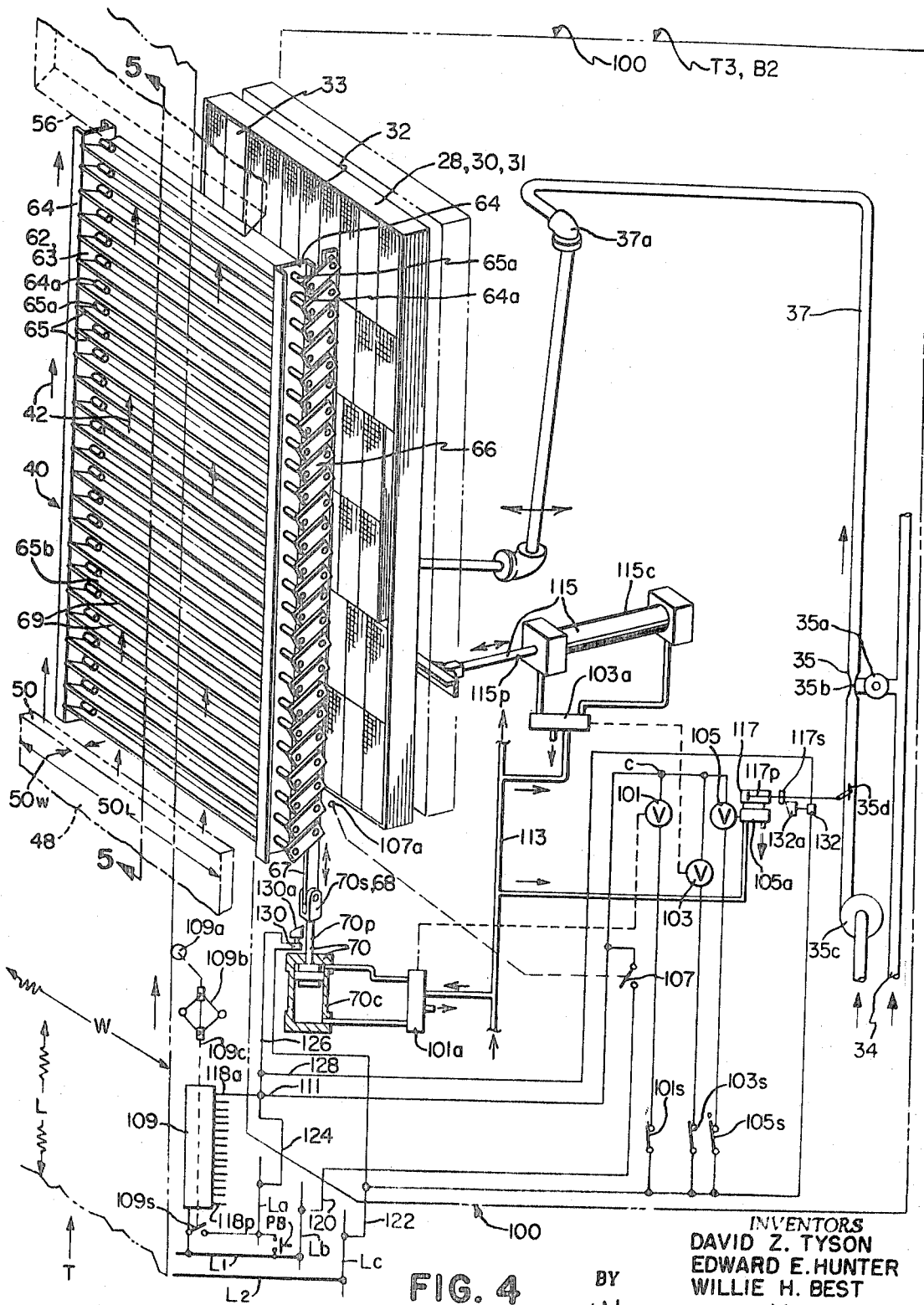
FIG. 4 is a schematic perspective view by the fabric element of one of the heating apparatuses with shielding means in FIG. 2 with some parts omitted or cut away for clarity, with the controls therefor shown schematically, and with portions of the gas moving means and nozzles shown in dot-dash lines.

Machine 10 has a plurality of apparatuses 16 therein for heating or drying the fibers in the yarn or fabric in continuous length element 12. These are arranged in eight tiers T1–T8, and in two banks or runs B1 and B2 so that each of 16 apparatuses 16 therein may be identified as to location, as to tier and bank, such as the apparatus in the lower left-hand corner of FIG. 1 being identified as apparatus 16 in tier T1, Bank B1. Apparatuses 16 in both banks are arranged in series along the length of element 12 in the tiers while any two horizontal apparatuses 16 in opposite banks B1 and B2 and in the same tier are arranged on opposite sides of fabric element 12 in two different runs as it passes through tower 14. Each apparatus 16 in each tier and bank has a width wider than fabric element 12, as shown in FIGS. 3, 4 and 8, to provide a proper heating or drying action as will be brought out in more detail hereinafter.

HEATING OR DRYING APPARATUS 16

The remainder of this application will be directed toward the specific structure, mode of operation and advantages of each substantially identical apparatus 16 for heating or drying and considered either alone or in any tier or bank combination. The explanation hereinafter of apparatus 16 will emphasize the details in apparatus 16 in tier T3, bank B2 even though all 16 apparatuses 16 in FIG. 1 are identical in construction except that the two apparatuses in each tier are substantially mirror images of those in bank B2.

Each apparatus 16 includes heating means 18, preferably of an infrared emitting or radiating type, for drying the outer surface F1 or F2 of element 12 by infrared emission portions. Although heating means 28 may use any suitable infrared source, such as an electric quartz tube heating element, etc., it is preferred to use herein an infrared heater 32 having a fluid (preferably natural gas) fired flame for generating infrared radiation because of its economy of operation, rapid cooling, efficient heat transfer, and desirable radiating characteristics. Although any suitable infrared heater 32 may be used, one suitable form is disclosed in U.S. Pat. No. 2,775,294 granted Dec. 25, 1956 to G. Schwank and entitled "Radiation Burners" wherein a gas-air mixture burns on the outer surface of plate or mat 7 in that patent to heat it to incandescence causing this surface to emit infrared radiation then striking and heating element 12. Such burner 32 sometimes has a metal screen mounted about one-fourth inch from this radiant surface, extending parallel thereto, and being substantially coextensive with this surface serving as a reradiating screen to increase the burner efficiency and to assist in providing a uniform distribution of infrared radiant energy in the manner well known in the art. Then, combustible gas (fluid fuel) mixed with air burns so that the outer radiating surface of plate 7 has a visibly radiant temperature of approximately 1,300°–1,600° F. with the radiation intensified by the reradiating screen. Hence, infrared heater 32 has a mat or plate 7 carried flame for generating the infrared radiation emission portions for heating element 12.

Heating means 28 includes infrared heating panel 31 in FIG. 4 having spacer blocks 33 and heaters 32 (shown schematically by crossed lines in FIG. 4) arranged in a checkerboard-type pattern within its frame 30 to provide a planer, radiating face on panel 31 parallel to and facing element 12 surface F1.

The intensity and pattern of radiation desired may be varied by changing the number of heaters 32 and the number of spacer blocks 33 located within frame 30 of panel 31 and in changing their distribution within frame 30.

Each heater 32 in panel 31 is fed by gas fuel main line 34 in any suitable manner but here shown in FIGS. 1, 4, and 6 as through suitable gas fuel controls 38, and then in parallel through fuel control valve 35 and main gas line 37 to heaters 32 or through pilot line 36 for suitable ignition thereof.

Gas fuel controls 38 are shown herein in series as main shutoff valve 38a, gas pressure regulator 38b, gas pressure gauge 38c, low pressure switch 38d, hydromotor valve actuator 38e, vent valve 38f, blocking valve or protector 38g, and high gas pressure switch or protector 38h.

Fuel control valve 35, or fuel input control means, is of a zero governor mixing type having the advantage of allowing the mixture pressure, which in turn determines the quantity of fuel flow and temperature of the burners, to be varied by controlling the airflow volume into the mixer. In the zero governor system, the gaseous fuel under pressure from switch 38h is reduced to atmospheric pressure by zero governor or regulator 35a and then introduced at the throat of venturi 35b, as shown in detail in FIG. 6 and schematically in FIG. 4, through which air is forced by combustion air blower 35c with the airflow controlled by butterfly air valve 35d, located in the airstream flow between the blower and venturi. Hence, the fuel gas entering at atmospheric pressure is entrained in the air flowing through the venturi in a definite fuel-air ratio with the amount of gas entrained being dependent on the amount of air passing through the venturi, as controlled by butterfly valve 35d, to control the energy input to the burners or heaters 32. Also, the zero governor system has the advantage of providing complete control of the fuel flow, and providing instantaneous response, all under the control of butterfly valve 35d.

If desired, a richer gas mixture can be provided during starting by providing a bypass line from switch 38h, around regulator 35a and venturi 35b, and directly to main gas line 37 to the burners.

The fuel for pilot line 36 is tapped off main fuel line 34 downstream from gas pressure gauge 38c in FIG. 6 through pilot solenoid valve 36a, gas air mixer 36b for the pilot burner and pivotal connections 36a in FIGS. 2 and 6 to the burner igniter pilots.

For heaters 32, the emerging fuel-air mixture from venturi 35b travels upwardly in FIGS. 4 and 6 through main gas line 37 to burners or heaters 32 through pivotal connection 37a and burner panel manifold 37b in FIGS. 2, 4 and 6.

Any suitable conventional igniter and safety features are provided.

Each gas line 36 and 37 has pivotal connections 36a, 37a therein adapted to permit pivoting of the line components about a horizontal axis during horizontal movement of radiant heating panels 31 between solid and dot-dash line positions in FIG. 2, as will be described in more detail hereinafter.

Each infrared heating panel 31 heats an infrared heating zone 40 on the outer surface of element 12, such as on face F1 or F2, and the desired action in each heating zone 40 is to rapidly and uniformly dry fabric element 12 at a controlled temperature. This action is obtained in the present disclosure by rapidly and uniformly evaporating the moisture by the infrared radiation from panel 31, and by rapidly and uniformly removing by mass transfer the evaporated liquid molecules and heat from fabric element 12 in this heating zone 40 by apparatus 16. The following paragraphs will explain this mode of operation more carefully and more specifically.

Infrared radiation from burner 32 is an efficient method of heat transfer to provide the energy necessary to evaporate the water into its vapor form and is much better than many other type high temperature heating sources. The aforementioned Schwank-type infrared burner 32 emits strong radiation in the absorption band for water vapor for efficiently and rapidly vaporizing the water or aqueous molecules in the coating. The moisture within the fibers and adhesive coating is heated and evaporated within the time period necessary to dry the adhesive coating on the surface of the fibers while still permitting the moisture to escape therefrom before the outer surface of the adhesive is dried and/or cured sufficiently to form a skin or crust entrapping the remaining moisture.

Any suitable gas may be used, but air is specifically used herein even though the generic term "gas" is used wherever appropriate since any suitable gas may be used. A gas moving means moves gas stream 42 with respect to and between outer surface F1 of element 12 and shutter slats 65 of shielding means 62 through heating zone 40 in FIGS. 2 and 4: (1) during infrared heating of surface F1 for removing infrared generated heat products from surface F1, and (2) at all times (both when shutter slats 65 are open and closed) for removing infrared generated heat products from shutter slats 65. This gas stream 42 is a desirable part of this structure for removing the heat products and for preventing burn up or heat deterioration of element 12 or shutter slats 65, although stream 42 may be omitted and not necessary for lower heat intensity conditions with shutter slats 65 providing effective shielding of element 12 and adequate protection against damage. These removed heat products may take the form of: (1) heat removed from surface F1 and/or shutter slats 65 for controlling the temperature of surface F1 and/or shutter slats 65 by a cooling action, and/or (2) liquid molecules, such as water molecules, evaporated by the infrared and removed by gas stream 42 by mass transfer by scrubbing surface F1 with stream 42 so as to rapidly dry element 12 at a controlled temperature. Stream 42 is a rapidly flowing river of gas blowing at and traveling along and over surface F1 being heated or dried by the infrared and traveling along and over shutter slats 65. With fabric element 12 saturated with water based chemicals 19, a fast rate of drying of element 12 to remove the water is highly desirable. Fast drying results in minimum equipment size, improved control of drying conditions, and improved quality of element 12. The evaporated liquid molecules carried away by stream 42 include, of course, not only water molecules but molecules of any volatile material. The rate of drying is increased by removal of liquid molecules from surface F1 to allow better penetration of infrared energy and by the efficient mass transfer of water molecules to the gas by a scrubbing or vacuuming action of surface F1 by flowing stream 42. Flowing stream 42 also removes convectional heat from drying zone 40 and from fabric element 12 so as to provide a rigid control of the temperature of the fabric element so that it will not exceed the safe limit. The gas in stream 42 is cool enough to cool element 12 as it passes across it. This is a peculiar problem to a fabric, such as nylon, some types of which might be damaged if the temperature exceeded 250° F. Not all objects dried require this close temperature control by cooling; for example, ceramics, painted metal parts, etc., preferably pick up as much heat as possible and cooling is not desired since cooling is a detriment to efficient operation. It should be apparent that velocity of stream 42 will affect the extent of scrubbing action and rate of drying and the overall quantity of air flowing in stream 42 will affect both rate of drying and heat removal. Preferred condition of the gas in stream 42 is a relatively dry and cool gas, such as air at ambient conditions. The cool gas will have a greater capacity for heat pickup, and the dry gas will pick up the moisture and other evaporated molecules more quickly and is more transparent to infrared radiation from panel 31. Moisture laden gas interferes with the transmission of infrared rays (because it absorbs this infrared radiant energy) and interferes with efficient drying and heat transfer. Therefore, if gas stream 42 is heavily laden with moisture, it may substantially prevent transmission of the infrared rays from panel 31 to surface F1 and may serve as an insulating layer over surface F1 to prevent removal of heat and water vapor. Hence, recirculation of the gas in stream 42 would not be desirable because it would be hotter than desired so could not pick up more heat and could not cool element 12, and might well be saturated with evaporated molecules, such as water molecules, which would interfere with infrared transmission and pickup of evaporated water molecules. Hence, gas stream 42 permits infrared heaters 32 to operate at their most efficient temperature, is located as close as possible to fabric face F1 for fast drying, and still permits accurately controlling the surface temperature of element 12 to prevent damage thereto. Note that the infrared radiation from heaters 32 strikes heating zone 40 to provide drying at the same time as gas stream 42 scrubs the heating zone. This action provides most rapid drying with minimum size equipment.

The aforesaid gas moving means includes gas discharge means for directing gas stream 42 as a gas layer or gas curtain generally along and over surface F1 in heating zone 40 to provide the aforedescribed scrubbing action. Since the air of the condition described in the preceding paragraph is preferred, relatively cool, dry air at ambient conditions is drawn in by motor driven, discharge, fresh air or inlet fans 44 in FIG. 1 through inlet duct 46 in FIGS. 1, 2 and 3 to be forced through nozzle duct 48 and out discharge nozzles 50 in FIGS. 2 and 4 to form gas stream 42 for apparatus 16. Gas discharge nozzle 50 has a rectangular outlet having its length 50L in FIG. 4 many times greater than its width 50W.

Discharge nozzle 50 is preferably mounted so that length dimension 50L is generally parallel to surface F1 of element 12 in heating zone 40 and width dimension 50W is generally perpendicular to surface F1 with nozzle 50 directing its discharged gas stream portion generally along surface F1 in heating zone 40 from the lower edge of this heating zone for removing infrared generated heat products therefrom. It should be apparent that scrubbing action and heat removal will be obtained by having the discharged stream from nozzle 50 directed transversely across, longitudinally with (in cocurrent flow along run 12a), or longitudinally against (in contraflow along run 12b) travel direction T of element 12. Directing stream 42 across travel direction T (across element 12 width W) would not be desirable because stream 42 would not uniformly hit with the same velocity, impact and temperature each portion of width W of fabric element 12 so that the fabric would not be uniformly processed across its width. Nozzle 50 may be mounted near one edge of heating zone 40 with its length dimension 50L generally parallel to, or extending across, width dimension W of fabric element 12 with air stream 42 directed in heating zone 40 generally uniformly across the width of and along the length of movement T of element 12 either in the same direction (in cocurrent flow) or the opposite direction (in contraflow) to the movement T for generally uniformly removing liquid molecules over width W of element 12 to give width W uniform processing. It has been found desirable to mount nozzle 50 at the bottom of heating zone 40, as shown in FIGS. 1, 2 and 4, so that gas stream 42 is directed upward so that the natural convection will help move gas stream 42 toward gas exhaust vent 56.

Nozzle length dimension 50L should be at least as wide as width dimension W of fabric element 12 so that gas stream 42 will uniformly effect each increment of the fabric across its width as it travels in direction T. Dimension 50L should be preferably greater than fabric width W so that the lower velocity components in gas stream 42 emerging from the lengthwise ends of nozzle 50 do not travel across surface F1 and a more uniform velocity layer of gas in stream 42 travels along the length of element 12.

It is desirable to provide a generally uniform quantity of gas flowing over each portion of fabric element width W in heating zone 40 for generally uniformly removing the heat products across this width W, with such heat products being evaporated liquid molecules and heat for maintaining a generally uniform temperature across fabric element width W in heating zone 40 since drying and heat removal are directly proportional to the quantity of gas flowing in stream 42 and since the scrubbing action is proportional to the velocity of flowing stream 42. This uniform distribution of gas across width W may be obtained either by carefully designing nozzle 50 and maintaining its width 50W constant while providing certain desirable gas turning vanes and baffles within nozzle duct 48 and closely adjacent nozzle 50 to control the distribution of gas flow to nozzle 50, or by making nozzle 50 adjustable.

It is also desirable to have gas stream 42 directed toward surface F1 to increase the scrubbing action and heat transfer action. Directing gas stream 42 toward and causing it to impinge against surface F1 has the advantage of increasing the scrubbing and heat transfer action when stream 42 strikes surface F1 a glancing blow and of protecting against adversely affecting the flame generated infrared radiation from flame-type infrared burners 32, as mentioned in the next paragraph. Water vapor in a boundary layer on surface F1 will also interfere with the transmission of infrared rays thereto and removal of convection heat therefrom so that striking surface F1 by stream 42 is desirable to break up this boundary layer.

If gas stream 42 strikes the radiating face of burners 32, it may adversely affect the flame generated infrared radiation from this flame-type infrared burner 32 by either adversely affecting the flame or by excessively cooling the outer infrared radiating surface on plate 7 in the aforementioned Schwank patent. The flame may be adversely affected by being blown out, sucked off the outer radiating surface of radiating plate 7 in the Schwank patent by the venturi effect under Bernoulli's Theorem, reduced in size, or at least adversely affected to reduce substantially infrared radiation output from the radiating plate surface by preventing proper flame combustion.

The gas moving means in each apparatus 16 also includes gas exhaust opening 56 having at least (and preferably much greater) flow cross-sectional area than the flow cross sectional area of gas discharge nozzle 50 and being similarly oriented with respect to surface F1 of element 12 but located on the downstream side of gas stream 42 from heating zone 40 and discharge nozzle 50. Preferably, the mouth of each exhaust opening 56 is larger in dimension 50W than discharge nozzle 50 since gas stream 42 to be exhausted has swelled in volume since it has picked up heat and moisture so that a larger volume has to be exhausted through gas exhaust opening 56. Apparatus 16 in FIGS. 1 and 2 has exhaust opening 56 exhausted by exhaust fans 60 in FIG. 1 through ducts 58.

Although the present invention is illustrated with gas stream 42 used therein, it will be readily apparent as the description proceeds that many of the advantages of the present invention are obtained when gas stream 42, gas nozzle 50 and exhaust opening 56 are omitted, so that the invention in its broader aspects does not include such structure therein.

Shielding means 62 is a shutter panel shown in FIGS. 1, 2, 4 and 7 located at all times in each apparatus 16 between infrared emitting heating means 28 and heating zone 40 in all of the different shielding positions assumed by its venetian-blind-type shutter slats or blades 54. This shielding means 62 comprises a venetian-blind-type blind 63 having slats 65 spaced along the length of element 12 in direction of movement T and extending generally transverse thereto along element width dimension W. Shielding means 62 operates and is constructed very similar to a conventional venetian-blind or shutter made up of individual, thin, generally rectangular slats or blades 65 interconnected together but movable or adjustable simultaneously to any selected angle to regulate the light, wave or emission portions; and air or gas stream portions passing therethrough by use of some suitable-type actuator, here shown as including cylinder-piston unit 70 in FIG. 4. Each shielding means 62 includes two base members 64 in each apparatus 16 extending generally vertically and parallel in FIG. 4. A plurality of shutter slats or blades 65, here shown as 25 in number in each panel 62, each have coaxial rods 65a connected to the opposite ends of the plate portion 65b of each shutter slat 65 in turn each rotatably supported in plain bearing 64a in base member 64 as plain bearing connections to permit any necessary oscillation of each shutter slat 65 in its base members 64 about the axis provided by coaxial rods 65a. These rods 65a are preferably drill rods, and no lubrication is required in these bearing connections in view of the similarity of materials in rods 65a and steal base member 64 in spite of the large variation in temperature to which they are subjected.

Each apparatus 16 includes apparatus subframes 16a and 16b detachably secured by nut-bolt units 16c and 16d respectively to structural members 14a of drying tower 14. Subframe 16a rigidly carries respectively heating means 28 and burner controls thereof with shutter base members 64 of associated shutter panel 62, and subframe 16b rigidly carries inlet gas stream duct 46 with exhaust duct 58 of apparatus 16 therebelow.

Each shutter slat 65 is formed of any suitable material and has any suitable construction. It has been found desirable to make plate portion 65b of aluminized steel, since it maintains for a long time its reflectivity of infrared radiation in use and has good heat transmissibility; and with a plurality, here shown as three, longitudinally extending cold work breaks 65c in FIG. 5 spaced along the shutter slat width to make the shutter slat more rigid lengthwise and to prevent sag thereof when subjected to extreme heat conditions or intense infrared radiation.

The common actuator for all of the venetian-blind slat 65 in shutter panel 62 in FIG. 4 includes a bellcrank arm 66 secured to the outer end of one of the rods 65a on each shutter with the distal ends of these arms 66 pivotally connected to a common connecting rod 67 pivotally connected by cleavis 68 to the upper end of piston 70p in fluid-actuated cylinder-piston unit 70 so that moving piston 70p to the position shown in FIG. 4 in its stationary cylinder 70c, will move shutter slats 65 to an open (one of the less shielding) position 62c shown in FIG. 4 and in dot-dash lines in FIG. 5 and lowering piston 70p will move the slats 65 to the solid line position 62c in FIG. 5 as a closed, or one of the more shielding positions. Hence, vertical movement, or reciprocation, of connecting rod 67 in FIG. 4 will open or close the individual shutter slats or blades 65 so as to control the total effective aperture area of infrared transmission in both directions by infrared transmission zones, apertures or orifices 69 between heating means 28 and heating zone 40 in its respective apparatus 16.

Now, it should be apparent that shielding means 62 in FIG. 4 intercepts in a shielding position the travel or at least some of the portions here recited between infrared emitting heating means 28 and outer surface F1 on element 12 in heating zone 4—with these intercepted portions including infrared emission portions traveling from right to left in FIG. 4 from heating means 28 to heating zone 40 between shutter slats 65 and including gas stream portions able to travel from left to right in FIG. 4 from heating zone 40 toward heating means 28 between shutter slats 65. Piston 70p of the shielding control means is adapted to move slats 65 between a plurality of positions, including more shielding positions and less shielding positions, between a fully closed position 62c shown in solid lines in FIG. 5 and an open position 62c shown in dot-dash lines with the less shielding positions permitting the travel of more of any of these portions through transmitting zones or apertures 69 between heating zone 40 and heating means 28. In any of the less shielding positions, infrared emission portion transmitting zones 69 are located between adjacent shutter slats 65; are of generally uniform widths; extend across element 12; permit uniform infrared heating of element 12 across width W of element 12; and are at least partially, or fully, closed in each of the more shielding positions.

These adjustable shutter slats 65 are adapted for quick opening and closing. In an open or partially open position, shutter slats 65 allow the radiant, infrared heat to pass through shielding means 62 from heating means 28 to element 12 and heating zone 40, while keeping the cooling and drying gas stream 42 confined close to element 12 and away from flame-type radiant heating means 28 so as not to cool, or otherwise adversely affect, heating means 28. In closed position 62c, shutter slats 65 intercept and prevent the infrared heat from heating means 28 from reaching element 12 in heating zone 40 while the cooling and drying air in stream 42 continues to flow over element 12 and shutter slats 65 to avoid heat damage to both slats 65 and element 12, such as might occur when element 12 stops. This heat protection is obtained even though infrared heating means 28 may still be emitting the same high infrared output. It should be apparent that shutter slats 65 may be moved to intermediate positions to control the intensity and amount of heat reaching element 12 heating zone 40 even when heating means 28 is maintaining a constant and high infrared emission rate. Hence, the various positions of slats 65 are able to change almost instantaneously the flux density, or infrared energy, striking element 12 in heating zone 40. The aforedescribed infrared emission portion transmitting zones 69 between the shutter slats 65 act as infrared energy transmission apertures 69 rapidly varied in size and area by repositioning of piston 70p to provide the same infrared energy transmission control as obtained for light transmission by a conventional venetian-blind.

If gas stream 42 is moving at too high of a velocity or if too large of a quantity of gas is flowing in stream 42, the infrared radiation from flame-type burner 32 may be adversely affected, as aforedescribed. Reducing and eliminating this adverse effect has been achieved by insertion of shutter panel 62 as a deflecting screen in FIG. 2 preferably secured to subframe 16a; mounted between infrared heater panel 31 and fabric element 12 to be dried; extending generally parallel to fabric surface F1 in heating zone 40; and extending generally parallel to the direction of movement T of fabric element 12. Broadly speaking, this shutter panel 62 is a burner shielding means intercepting the infrared rays from the emitting surface of infrared panel heating surface 31 to element surface F1 in heating zone 40 for preventing adversely affecting the flame generated infrared radiation, such as by shielding the flame on infrared heaters 32 from blowout, by gas stream 42 while permitting infrared rays from heaters 32 to strike surface F1 in heating zone 40 for drying.

Gas stream 42 and screen 64 coact to provide numerous advantages. Velocity of stream 42 discharging from nozzle 50 may be as high as 6,800 feet per minute without adversely affecting infrared radiation from burners 32. Also, a portion of the gas layer in gas stream 42 moves across the fabric side of panel 62 while heaters 32 are emitting infrared heat so as to reduce any infrared elevated temperature of panel 62 so as to prolong its useful life, and to minimize warping and oxidation thereof. Higher velocity gas stream 42 substantially increases the speed of uniform drying while still maintaining element 12 at a controlled temperature. The fabric quality produced is still better and is produced on smaller sized equipment. Hence, a great superiority is obtained by using panel 62. Gas stream 42, traveling between fabric element 12 and panel 62, at high velocity accelerates the drying while panel 62 diverts this gas from the flame generated radiating surface on burners 32 to allow efficient burner operation. The higher velocity gas removes water vapor more quickly to greatly increase the drying efficiency while still maintaining fabric temperature more uniform across dimension W and at a lower temperature.

Also, this fast drying action makes possible production of cord fabric without a "webbed" condition, wherein the adhesive liquid forms a hardened film across the open mesh of the fabric securing adjacent cords together.

If gas discharge nozzles 50 are properly designed to keep gas stream 42 flowing in a laterally compact and flat stream close to element 12, shutter panels 62 will not need to provide much gas stream shielding effect for heating means 28.

Figure 7:
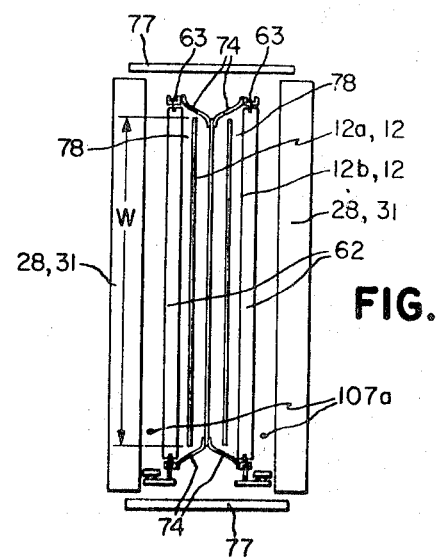
FIG. 7 is a top plan view, taken generally along the line 7—7 in FIG. 2 of the gas stream flow ducts, infrared panels, reflector means, center wall, and heat shields surrounding the element.

Two panels 62 in any given tier, such as tier T3 in FIGS. 1, 2 and 7, has secured to each vertical base members 63 in FIG. 7 a reflector plate 74, four in number for each tier, straddling the edge of fabric element 12, and preferably formed of aluminized steel to maintain their reflectivity. The inner ends of four reflector plates 74 are secured to center wall 76, preferably made of suitable infrared reflecting material capable of withstanding high operating temperatures, such as aluminized steel, Maranite (pressed asbestos board) etc. In each tier, such as tier T3, two heat shields 77 in FIG. 7 straddle heating zones 40 and are supported by hooks on subframes 16a. These four reflector plates 74 form two generally parallel reflector means extending along direction T of relative movement of element 12 and straddling the opposite edges of element 12 for heating those edges in heating zones 40 more uniformly by infrared radiation by reflecting the infrared radiation back onto these edges of the fabric, since these edges would not otherwise get sufficient radiation since they are close to the edge of panels 31. Hence, these reflector plates assure uniformity of infrared radiation over full width W of fabric element 12 by capturing the infrared radiation that would otherwise escape laterally through the gap between panels 31.

Flow ducts or flow channels 78 are formed, one duct outside each side of fabric element 12, for conveying the gas in each gas stream 42 as an air curtain from its discharge nozzle 50 to its exhaust openings 56. Each gas flow duct 78 extends along the length of element 12, has element 12 surface F1 or F2 as one wall thereof, and is mounted to receive gas stream 42 from discharge nozzle 50 for keeping gas stream 42 flowing over and close to this element surface and for discharging the gas stream 42 into discharge opening 56 for exhausting from tower 14.

Each vertically extending flow channel or duct 78 for gas stream 42 is formed by surface F1 or F2 of element 12, two reflector plates 74 and element 12 side face of panel 62 with these two ducts 78 each being generally trapezoidal in cross section, generally parallel, and straddling element surfaces F1 or F1 and F2. Each panel 62 is preferably secured in FIG. 2 against lateral movement relative to gas discharge nozzles 50 and element surfaces F1 and F2 in heating zone 40, and therefore will not move with panels 31 as they are retracted to the dot-dash line positions in FIGS. 2 and 4 during infrared shutdown. Hence, there is a constant geometry between panels 62 and element 12 for controlling the thickness of gas streams 42 straddling element 12, which geometry will not change even though panels 31 are movable between the solid and dot-dash line positions in FIG. 2.

Each duct 78 plays an important part during travel of its stream 42 from discharge nozzle 50 to exhaust vent 56. Duct 78 guides, holds laterally compact and prevents lateral dispersion of stream 42 to maintain the flow action of stream 42 in direction T along element 12 and toward exhaust vent 56 while keeping stream 42 in close contact with element face F1 or F2.

Although two ducts 78 and four reflector plates 74 have now been described for two apparatuses 16 in FIGS. 2 and 7 for convenience, it should be apparent that a single duct 92 straddled by only two reflector plates 74 give the same advantages for a single apparatus 16.

HEATING MEANS AND SHUTTER PANEL CONTROLS IN DRYING APPARATUS 16

Each heating apparatus 16 has venetian-blind-type shutter panel 62 permitting: (1) starting and stopping of web element 12 without damaging element 12 by applying excessive heat thereto; (2) quick control of the heat from the infrared generator 28 to web element 12 by either (a) closing slats 65 to position 62c to protect element 12 when stopped against the residual infrared heat in infrared generating heating panel 31 or to reduce the infrared heat applied to element 12 in heating zone 40, or (b) having the infrared heating panel 31 on and subsequently opening shutter panel 62 to position 62c to apply quickly, or to increase, infrared heat to element 12; and/or (3) maintaining stream 42 of high velocity gas traveling in contact with heated surface F1 of element 12 and prevented by shutter slats 65 from blowing out or cooling the flame on the gas-fired infrared heating panel 31.

A plurality of heat output control means are provided for controlling the infrared heat output from heating means 28 to element 12 in heating zone 40. This means includes the fuel input control means provided by butterfly valve 38d in FIG. 4 of fuel valve 35; flowing gas stream 42 adjusted by piston cylinder unit 117 controlled by cam 132a; shutter slats 65 adjusted by piston-cylinder unit 70 controlled by cam 130a; piston-cylinder unit 115 for moving infrared panel 31 between the solid and dot-dashed line positions; etc.

Now, there will be described the operation of control panel 100 for apparatus 16 in FIG. 4 in this sequence: (1) single apparatus 16 in tier T3, bank B2 having infrared heating occurring with shutters slats 65 in FIG. 1 in their open, dot-dash line position 62c in FIG. 5 and with element 12 traveling at maximum speed in direction T and then (a) element 12 is stopped and heat to element 12 is reduced, (b) the over temperature control occurs to reduce the heat output from heating means 28, (c) element 12 is started to move in direction T and heat is applied thereto, and (d) travel speed of element 12 is in direction T at a lower speed, or never reaches the original high speed travel in that direction; and (2) the sequence of operation and programming of multiple apparatuses 16 at different tiers T and banks B to work in a manner coordinated by speed and also to provide different temperature combinations or heat intensities on element 12.

FIG. 4 shows control panel 100 for apparatus 16 in tier T3, bank B2 in solid line position when element 12 is traveling at high speed in direction T and infrared heat output from heating means 28 is at a maximum. Now, valve actuating solenoids 101, 103, and 105 are not energized since high temperature switch 107 and stop switch 109s are open, and speed controlled switch box 109 has deenergized line 111. Deenergized solenoids 101, 103, and 105 have respectively moved their respective solenoid controlled four-way valves 101a, 103a, and 105a to the position so that the fluid pressure in air line 113 has moved piston 70p for actuating shutter slats 65, piston 115p for actuating heating panel 31, and piston 117p for actuating butterfly valve 35d to the solid line positions shown with the shutter slats 65 in their fully opened position, heating panel 31 in its advanced and solid line position closest to element 12, and butterfly valve 35d in its fully opened position to provide maximum fuel-air mixture to heating panel 31. Then, heating panel 31 has its maximum infrared output and maximum infrared emission occurs through shutter panel 62 to provide maximum infrared intensity in heating zone 40.

When the driving action of drive rolls 22, 23 and 24 in FIG. 1 on element 12 is shut down so as to stop the relative movement of element 12, it is important in each of the 16 apparatuses 16 in tower 14 to immediately shut down infrared radiation from heating means 28 in all apparatuses 16 and to continue the flow of gas stream 42 undiminished, by continued energization of the gas moving means, so as to relatively move gas stream 42 with respect to and over surfaces F1 and F2 of element 12 in all heating zones 40 so as to prevent residual heat from heating means 28 from raising the temperature of and damaging element 12. This action will be described herein for only one apparatus 16 since the 16 in tower 14 are simultaneously controlled in the same manner. Here, inlet fans 44 and exhaust fans 60 in FIG. 1 operate continuously so as to run when fabric element 12 is stopped as well as when it is being driven in the direction T during fabric processing, heating or drying.

When element 12 stops traveling in direction T, the heat output control means includes means responsive to stopping of element 12 for cutting off the infrared heat output to element 12 in heating zone 40. Then, any one or all of these actions can occur to reduce heat output: (1) closing of shutter panel 62 to its solid line position 62c in FIG. 5, (2) retracting burner panel 31 to its dot-dash line position in FIGS. 2 and 4, and/or (3) cutting off the fuel to burner panel 31 by closing butterfly valve 35d.

Speed controlled switch box 109 may be of any suitable type but is shown schematically here as having a follower 109a driven by element 12 in turn rotating a centrifugal-fly-weights type speed governor type mechanism 109b adapted to move endwise upon change in speed control shaft 109c of switch box 109 adapted to trip different switches within switch box 109 for different speeds of element 12 for energizing in different manners or sequences from line L1 the outlet cables 118a–118p leading respectively one to each of the 16 apparatuses 16 in FIG. 1 and adapted to close switch 109s when element 12 stops.

When element 12 stops, closed switch 109s in FIG. 4 forms Circuit No. C1 from line L1 through normally open switch box 109 actuated stop switch 109s now closed; lines La, 124 and 111 to circuit terminal C to begin a "Reducing Heat Output Sequence" described hereafter; in parallel through valve actuating solenoids 101, 103 and 105 and normally closed solenoid control switches 101s, 103s, and 105s; lines 122 and Lc; and Line L2. Energizing solenoids 101, 103 and 105 will respectively cause piston 70p to move downwardly until shutter slats 65 are in their fully closed and solid line position 62c in FIG. 5, piston rod 115 to move to the right in FIG. 4 to move burner panel 31 to its dot-dash line or retracted position, and piston 117p to move to the right in FIG. 4 to close butterfly valve 35d to reduce the infrared heat radiation in heating zone 40 in three different ways. Any one, two or three of these ways may be deactivated and caused not to occur, or if it has occurred, to return to its full heating position by selectively opening control switch 101s, 103s and/or 105a to deactivate its respective controlled solenoid (101, 103 and/or 105) so that its respective piston rod (70p, 115p and/or 117p) will return to the solid line position shown in FIG. 4. Hence, the operator has the opportunity of electing which one, two, or three of these events will occur. This ends the description of the "Reducing Heat Output Sequence." For example, if travel of element 12 is expected to be interrupted only momentarily, or even for a considerable period of time, it may be desirable to only close shutter panel 62, but to permit burner panel 31 to remain in its advanced position and supplied with maximum fuel-air mixture by opening only switches 103s and 105s. Then, the heat output control means comprises only means for operating the shielding means 62 to intercept the travel of more of the infrared emission portions in the closed, or more shielding, position 62c and this action changes the heat output to heating zone 40 independently of the residual heat in heating means 28 and with gas stream 42 keeping shutter slats 65 and element 12 sufficiently cool to prevent heat damage thereto. This is a preferred mode of operation in continuous processing of element 12 since stopping of element 12 is usually not for an extensive period of time, and this mode of operation permits the full infrared output of heating panel 31 to be available immediately to element 12 upon reopening shutter slats 65.

Heating panel 31 is moved between the solid and dot-dash line positions in FIGS. 2 and 4 by cylinder-piston unit 115 comprising cylinder 115c pivotally connected at 115d in FIG. 2 to subframe 16a and having the free end of its piston 115p secured pivotally by clevis 15f to arm 31a secured to and projecting outwardly from the back of burner panel 31 and braced thereto by diagonal brace 31b. Two parallel links 121 are pivotally secured at their lower ends to arm 31a and at their upper ends to subframe 16a at spaced points so that burner panel 31 is swung through a slight arc by a parallelogram motion in moving between solid line and dot-dash line positions by cylinder-piston unit 115. If burner panels 31 are not to be retracted in some or all of the apparatuses 16, the burner panel selected to remain stationary can be retained in the advanced and solid line position by clamping arm 31a in the burner panel advanced position on subframe 16a and disconnecting its valve 103a from pressure line 113. Hence, the heat output control means comprises a heating means positioning means for moving heat output panel 31 of heating means 28 between a retracted position and an advanced position relative to heating zone 40 for controlling the heat output to said heating zone 40.

If shutter slats 65 are shut and heating means 28 is emitting high heat, there is possibility of overheating the apparatus, including shutter slats 65. Then, the heat output control means includes shutoff means for burner or heating means 28. This includes high temperature or over temperature limit switch 107 having heat responsive element 107a, such as a high temperature bimetal heat responsive element, located between shutter panel 62 and heating panel 31 so as to be responsive to a given high temperature condition therebetween. The high temperature of element 107a will close switch 107 to form Circuit No. C3 from line L1 to line Lb, line 120, normally open switch 107 now closed, and circuit junction C to go through the aforedescribed "Reducing Heat Output Sequence." Heat responsive element 107 is located in a heat chamber formed by shutter panel 62, heating panel 31, and straddling heat shields 77 in FIG. 7. As mentioned earlier, there is an advantage to just closing shutter slats 65 and not turning off heating panel 31. To gain this advantage, this high temperature, or overtemperature, limit switch 107 is set not to close until about 30 minutes has elapsed with this closed shutter condition.

When element 12 is stationary, such as in the beginning of operation of machine 10, and has not started to travel in direction T, it is desirable to have full heat available at heating panel 31 before shutter slats 65 open so as to provide immediately full heat to eliminate 12 as soon as it begins to move and shutter slats 65 open. After Circuit No. C1 formed, the "Reducing Heat Output Sequence" occurred with energization of solenoids 101, 103 and 105. Now, if switches 103s and 105s are opened, shutter slats 65 will remain in their closed position, but heating panel 31 will advance to its solid line position and butterfly valve 35d will open so that heating panel 31 will have high infrared output even though closed shutter blades or slats 65 protect stationary element 12. As element 12 gets up to speed, stop switch 109s opens to break Circuit No. C1 to open shutter slats 65 and full infrared heat is immediately applied to element 12 so that switches 103s and 105s can then be closed to make ready the circuitry control for reforming the safety Circuit No. C1 or No. C3, if necessary. Hence, the heat output control means here includes means for providing infrared heat output by heating means 28 while element 12 is stationary and shielding means 62 is in a more shielding position, such as a closed position 62c, and includes means for moving shielding means 62 to an open, or less shielding, position upon movement of element 12 in direction T so that a quick increase in heat exposure time is obtained by having heating means 28 energized before shielding means 62 moves to this less shielding, or open, position.

Pushing emergency stop button PB will cut off all heat to element 12 to energize solenoids 101, 103 and 105 by forming Circuit No. C5 from line L1 to normally open push button PB; lines La, 124 and 111; and circuit junction C to go through the aforedescribed "Reducing Heat Output Sequence."

Although control 100 described heretofore and illustrated in FIG. 1 will work satisfactorily, there may be added to control 100 a modulating control for shutter panel 62 and fuel input by butterfly valve 38d used to provide multistep control of the infrared output to heating zone 40 for each apparatus 16 and to provide various combinations of heating by the different apparatuses 16 at different speeds of element 12. The addition of this modulating control includes adding in control panel 100 cables 126 and 128, stepping switches 130 and 132 and their respectively driven cams 130a and 132a, and adding more wires to cables 118a–118p where necessary.

But before describing this modulating control, it is preferred to briefly describe the relationship of control panels 100 (one control panel 100 being shown in FIG. 4 for apparatus 16 in tier T3, bank B2) for all of the control panels 100 in the plurality of apparatuses 16 in drying tower 14. Each apparatus 16 has control panel 100, substantially like control panel 100 shown in FIG. 4. Power lines La, Lb and Lc in FIG. 4 extend vertically through drying tower 14 with each control panel 100, one for each apparatus 16, having its own lines 124, 120, and 122, respectively, connected thereto in the same manner as shown in FIG. 4. Only one speed controlled switch box 109, follower 109a, switch 109s, and emergency stop button PB is used but the sixteen apparatuses 16 each has its own individual cable leading thereto from the group of sixteen cables 118a–118p in FIG. 4 connected to line 111 in its own control panel 100. Hence, all sixteen control panels 100 are under the control of the same speed controlled switch box 109.

Each of the sixteen control panels 100 has a similar modulating control (varying in wiring) for the shutters and fuel input but with each secured to different contacts within switch box 109 by its respective cable 118a–118p. For example, the modulating control in FIG. 4 includes cable 118a branching out into power line 111 earlier described and two cables 126 and 128, each having a plurality of electrical lines therein, and operatively connected to energize respectively conventional type, electrically actuated, solenoid driven, rotary stepping switches 130 and 132 (commonly called a finder type or self-interrupted type rotary stepping switch), respectively, rotatably driving cams 130a and 132a into different travel impeding relationships respectively with shoulders 70s and 117s carried respectively by pistons 70p and 117p to establish different piston stopping positions short of the shutter panel 62 closed and butterfly valve 35d closed positions when the fluid pressure in these respective cylinders urge them toward these closed positions. It should be apparent that any one or more preselected intermediate shutter open or butterfly valve open positions may be prechosen by merely the hookup provided between the component lines or wires of cables 126 and 128 with the many speed control switches in box 109 through cable 118a and the different stepping positions of stepping switches 130 and 132. Also, since each stepping switch 130 and 132 has a plurality of arcuate positions able to be preselected by actuation of switches in switch box 109, a plurality of different intermediate positions are available between fully opened and fully closed positions for shutter panel 62 and butterfly valve 35d and the position of the slats 65 in shutter panel 62 can be selected independently of the position of butterfly valve 35d. Also, suitable time delay can be provided where necessary in switch box 109 for some cables 118a–118p so that stepping switches 130 and 132 will reach their final selected positions before solenoids 101 and 105 energize and moved their controlled pistons into engagement with stops 70s and 117s.

If stepping switches 130 and 132 are used, it may be necessary to restore their cams 130a and/or 132a to their noninterfering position with respect to travel of piston 70p and/or 117p whenever the control wants shutter panel 62 or butterfly valve 35d fully closed by energized solenoid 101 and/or 105. For example, when Circuit No. C1, C3 or C5 was formed, as aforedescribed, energization of these solenoids 101 and 105 and full closing of shutter panel 62 and butterfly valve 35d were desired.

This action may be accomplished by having conventional rotary switch homing units on rotary switches 130 and 132 energized from then energized line 124 to line L2 to return rotary switches 130 and 132 to "0" position where cams 130a and 132a do not interfere with these piston travels. When switch 107 is closed, shutter panel 62 and stop switch 109s will be closed when element 12 is stopped.

This modulating control for the shutters and fuel input can be set in several different ways for each apparatus 16 to satisfy the drying and processing needs for element 12, such as when element 12 is an adhesively coated fabric. First, shutter slats 65 and butterfly fuel valve 35d may be caused to assume different positions at different element 12 speeds between stopped and full speed travel in direction T, earlier described. Hence, the heat output control means thus includes means responsive to the slowdown of element 12 from high speed for reducing the heat output to heating zone 40 in that particular apparatus 16. Hence, the infrared passageway openings 69 in shutter panels 62 and the fuel sent to the heating means can be modulated as a function of the speed and the heat requirements of element 12 when it passes the particular drying apparatus 16. Second, any selected combination of heats from the sixteen different apparatuses 16 can be made at each speed with different combinations available for different speeds. For example, all of the apparatuses 16 can be turning out the same uniform high or low heat; some may be shut off; some may be operating at maximum infrared heat output and others at minimum or some intermediate output; etc. For example, in FIG. 4, cable 118a could provide electrical lines to adjust the heat output by heating means 31 by forming Circuit No. C7 from line L1 to the proper closed switch or switches in box 109, cable 118a to line L2; (1) through stepping switches 130 and 132 to move cams 130a and 132a to the desired intermediate heat output position, and (2) subsequently through line 111, circuit terminal C and in parallel through solenoids 101 and closed switch 101s and through solenoid 105 and closed switch 105s when switch 103s is open so as to bring stops 70s and 117s down against cams 130a and 132a to locate shutter panel 62 and butterfly valve 35d in the desired partially open position. If it is desired that the heat from particular apparatus 16 being controlled be shut off instead of be at intermediate heat output, the aforedescribed portion (1) of Circuit No. C7 need not be used and the homing units of switches 130 and 132 may be energized instead in that particular one of the 16 apparatuses 16.

The number of combinations available is nearly inifinite, and can be selected by the drying needs of element 12 for its wetness condition and speed of travel in direction T. Hence, the heat output control means includes means responsive to the speed of travel of element 12 for controlling the plurality of apparatuses 16 so that different apparatus 16 heat output combinations are provided. For example, since element 12 can stand more heat when it is wetter but there is danger of burning or damaging element 12 if too much heat is applied after it becomes partially dry, heating means 28 of apparatuses 16 in bank B2 on the downstream side of rolling support roller 24 may be adjusted to emit a lower infrared heat output to run 12b in their heating zone than the upstream heating means in apparatus 16 in bank B1 to run 12a so that wetter element 12a in the upstream heating bank can be dried more rapidly but the dryer element 12b in the downstream heating bank will not be burned or otherwise heat damaged.

While fabric element 12 is laden with liquid, temperature control of element 12 is not critical because the latent heat of evaporation of the liquid makes it easy to maintain the temperature of element 12 relatively close to the boiling point temperature of the liquid. However, after most liquid has been removed from element 12, maintenance of this element temperature is more difficult as may occur when processing of element 12 requires a curing operation, additional heat treatment, etc. Fabric element 12, then in view of its lower specific heat and small weight, can be maintained at uniform temperature (or at a selected and controlled rate of temperature change or final temperature) only by providing quick infrared energy level change in heating zone 40 if element 12 stops or changes in speed.

Stepping switch 130 provides modulating control to the infrared transmission zone 69 sizes in shutter panel 62. Hence, the heat output control means thus comprises means for operating shielding means 62 to intercept the travel of more of the infrared emission portions in the more shielding positions and changes the heat output to heating zone 40 independently of the residual heat in heating means 28. Hence, immediate change in infrared energy level will be obtained by repositioning shutter blades 65, and if necessary, butterfly valve 35d to change the output of heating means 28.

It is desirable that the position of shutter slats 65 generally control the heat intensity in heating zone 40 and the shutter slats be only partially open then so that there will be immediately available more infrared energy from the heating means in the event more heat output is required. Then, no thermal lag or inertia will occur in the flow of infrared heat as might occur if the shutters were fully open and infrared output would have to be adjusted and controlled by only butterfly valve 35d.

Generally, thermal inertia of infrared heating means 28 prevents quick enough energy output change in response to the demands of the control. After the control demands a decrease in infrared output, reducing fuel to the heating means requires too long to respond. The present invention overcomes this problem by permitting shutter slats 65 to decrease immediately the infrared transmission energy apertures or zones 69 in shutter panel 62 so that the heat intensity in heating zone 40 is independent of the thermal inertia of the heating means.

Since piston 70p and stepping switch 130 are responsive to speed of element 12 and thus responsive to the temperature or heat buildup in element 12, they form part of the heat output control means operatively connected to the shielding means 62 for moving shutter slats 65 in such a manner as to maintain the desired temperature of element 12.

Panels 62 have numerous advantages given in the following numbered paragraphs.

First, each heating apparatus 16 has venetian-blind-type shutter panel 62 permitting: (1) starting and stopping of web element 12 without damaging element 12 by applying excessive heat thereto, (2) quick control of the heat from infrared generators 31 to element 12 by either (a) closing slats 65 to protect element 12 when stopped against the residual infrared heat in infrared generating heating panel 31 or to reduce the infrared heat applied to element 12 in heating zone 40, or (b) having the infrared heating panel 31 on and subsequently opening shutter panel 62 to apply quickly, or to increase, infrared heat to element 12, and/or (3) maintaining stream 42 of high velocity gas traveling in contact with heated surface F1 of element 12 and prevented by shutter slats 65 from blowing out or cooling the flame on gas-fired infrared heating panel 31.

Second, shutter panel 62 is especially adapted to uniformly treat element 12 in a modulated manner uniformly across its width dimension W. The infrared transmitting zones 69 between shutter slats 65 extend across width dimension W and are generally of uniform rectangular size; gas stream 42 is uniformly distributed across width dimension W and travels along direction T to uniformly process each portion of the width W of element 12. Also, shutter panel 62 remains in the same position at all times between heating means 28 and heating zone 40; in contrast, a sliding type, opaque curtain (instead of venetian-type-blind 62) would have to slide between this position in front of heating means 28 for blocking infrared transmission and an infrared transmission position to one side of heating means 28. Such sliding-type curtain would have the disadvantages of over exposing some portions of element 12 and under exposing other portions of the infrared radiation during travel between these positions, slowness in response in travel between the positions, and inability to throttle or modulate infrared transmission except on a completely off or on basis.

Third, shutter panel 62 permits quick shutoff of infrared heat to heating zone 40, quick turn on of this heat, and accurate and infinite step variation of this heat by quick and easy adjustment of the infrared transmitting zones 69 sizes by a venetian-type-blind movement of shutter slats 65.

Fourth, shutter panel 62 prevents adverse effect on the flame energized heating means 28 by flowing gas stream 42. Shielding means 62 orients gas stream portions 42 close to and over element 12 outer surface F1 and away from heating means 28 so as not to cool, or adversely affect, heating means 28. Shielding means 62 comprises a plurality of venetian-blind-type shutter slats 65 lying in a zone extending generally parallel to heating zone 40 with each shutter slat 65 inclined toward heating zone 40 in the direction of movement of gas stream 42 for directing the gas stream portions toward heating zone 40 and away from heating means 28. Inclination of slats 65 prevents bounce of portions of gas stream 42 through infrared transmitting zones 69 of shutter panel 62 and against heating means 28. Use of shutter panel 62 permits the use of extremely high velocity gas stream 42 without disturbance of the flame on heating means 28. Velocities as high as 6,800 feet per minute at gas discharge nozzle 50 have been successfully used. It should be apparent that the highest practical gas stream velocity is desirable because it assures adequate cooling of shutter slats 65 when they are closed and heating means 28 is operating at full infrared output, adequate cooling of element 12 to prevent heat damage thereto and to maintain any desired temperature thereof, and efficient and rapid evaporation of moisture therefrom by removal of any vapor layer evaporated from element 12 so as to provide rapid drying and to enhance efficient transmission of the infrared rays from heating means 28 to element 12 in heating zone 40 by rapid and efficient removal of the vapor layer otherwise inhibiting infrared transmission. This evaporated liquid vapor and removed heat is herein called the removed infrared generated heat products.

Fifth, shutter panel 62 desirably effects infrared generation and transmission. As mentioned earlier, infrared heaters preferably have in front of their flame-carrying plate, or a mat a reradiating screen to increase the burner efficiency and to assist in providing a uniform distribution of infrared radiant energy in front thereof. As this screen reflects heat back onto the flame-carrying plate or mat, the plate or mat increases in temperature, and since infrared radiation is a function of the temperature of the emitting source, better infrared radiation is obtained therefrom. Here, the grid of reflecting metal formed by parallel slats 65 of shutter panel 62 in front of infrared heater 32 acts like a similar reradiating screen in front of the mat for maintaining its radiating temperature and to provide a more desirable infrared radiation. Also, the angularity of slats 65 and the maintained reflectivity of the aluminized steel construction of plate portion 65b of each slat 65 will permit slats 65 to reflect or bounce the infrared radiation from heating means 28 through transmitting apertures 69 of shutter panel 62 to heating zone 40 even if the transmitting zones 69 are only partially open, and even if heating means 28 cannot clearly see element 12 through zones 69. The multiple angles on each slat 65, caused by the three cold work breaks 65c, enhances this ability to reflect, or bounce through, infrared radiation. Also, it should be noted that any bounced through radiation will be generally uniformly spread across the width dimension W of element 12 and diffused along length dimension L to uniformly process element 12 as it travels in direction T since the axis of oscillation of each slat 65 and the orientation of each cold work break c is generally parallel to width dimension W. Also, the six angular surfaces on plate portions 65b formed by the three cold work breaks straddling each infrared transmitting zone 69 causes the infrared rays passing therethrough to be diffused and reflected over a zone extending some length in dimension L on element 12 to minimize "hot spots" on element 12.

Sixth, shutter panel 62 can be moved to the fully closed position while heating means 28 continues to provide full infrared output without damaging fabric element 12, whether it is stationary or still travelling in direction T, because gas stream 42, moving across the surfaces of element 12 and shutter slats 65, removes the infrared generated heat products therefrom to prevent shutter burnup and element 12 damage.

Seventh, there is an advantage in being able to shut transmitting zones 69 in shutter panel 62 without turning off heating means 28 because most line stoppages of travel of element 12 in direction T are of short duration and the infrared heat is immediately available when infrared transmitting zones 69 again open to provide immediate fabric element 12 heat up and uniform processing.

TWO-PASS AND ONE-PASS POSITIONS

Element 12 may make either two passes or one pass, or run, through drying tower 14. FIGS. 1 and 3 of the drawings show in solid lines the two-pass position having two passes or runs 12a and 12b over drive rolls 23, 24, and 23a and show the one-pass position having only one pass or run 12b partially in solid and partially in dot-dash lines (to the right in FIG. 1 and to the left in FIG. 3) over drive rolls 23, 24, and 24a.

Drying tower 14 can be rapidly and easily converted from the two pass position in FIGS. 1, 2, 4 and 7 to the one-pass position in FIGS. 1 and 3. All of the apparatuses 16 in tier B2 in FIG. 1 can be moved from their solid line position in FIGS. 1 and 3 to their dot-dash line position in FIG. 3 for processing element 12 in the one-pass position over drive rolls 23, 24, and 24a in FIG. 1 by: (1) loosening and removing all of the nut-bolt units 16c and 16d in apparatuses 16 in tier B2 in FIGS. 1 and 2; (2) removing two of the straight duct sections 136 in FIG. 3 from gas stream inlet duct 46 in each apparatus 16 in tier B2 and replacing them with two angular duct sections 138, as shown in dot-dash lines; (3) removing four reflector plates 74 and center wall 76; (4) moving subframes 16a and 16b in all apparatuses 16 in Bank B2 from their solid line to dot-dash line position toward element run 12a to move all heating panels 31, gas discharge nozzles 50, gas exhaust openings 56, and shutter panels 62 in bank B2 into their dot-dash line position in FIG. 3; (5) attaching two modified reflector plates straddling the ends of element 12 with each plate attached at opposite ends to a base member 64 on each shutter panel 62; and (6) inserting nut and bolt units 16c and 16d in each apparatus 16 in tier B2 in FIG. 2 through appropriately located holes in subframes 16a and 16b, and then tightening these nut and bolt units to secure subframes 16a and 16b in the dot-dash line position in FIG. 3 to provide the one pass position.

Hence, heating means 28 in tier B2, or in the downward run or pass 12b of element 12 over rollers 24 and 23a is constructed to move between the solid line two pass and the dot-dash line one pass heating positions in FIG. 3 toward element run or pass 12a over rollers 23 and 24 so that all of the heating means 28 in tiers B1 and B2 now simultaneously heat opposite generally parallel faces F1 and F2 of element 12 in run 12a since machine 10 is now adjusted so that element 12 does not travel between the heating means in its earlier downward pass 12b over rollers 24 and 23a but now passes over rollers 24 and 24a. The gas moving means, including nozzles 50 and openings 56 in tier B2, are also constructed to move with its associated heating means toward tier B1 between these two pass and one pass heating positions.

Each of these positions, the one pass and two pass positions, have certain advantages mentioned in the next paragraphs.

The two-pass position shown in solid lines in FIG. 1 has the advantages of: (1) processing element 12 in minimum height of drying tower 14, so as to minimize capital investment; (2) providing element 12 at least partial drying in upward pass 12a over drive rolls 23 and 24, and further heat treatment during its downward pass 12b over drive rolls 24 and 23a; (3) providing twice as many drying apparatuses 16 in a given height drying tower 14 to permit finer adjustment of the heat differential between apparatuses 16 to provide better element 12 processing; and (4) providing contra gas flow gas stream 42 in downstream run 12b (gas streams 42 going upwardly while element 12 goes downwardly in direction T) to provide more rapid and complete drying of element 12 in run 12b.

A one-pass position has numerous advantages when heating means 28 and gas streams 42 are face-to-face on opposite sides of element 12 in each tier T. For example, if only one gas stream 42 were used and this struck only one side of element 12, element 12 might be laterally deflected and laterally flapped by this one gas stream 42 to put unnecessary tension on fabric element 12, to distort the shape of gas duct 78, to move element 12 away from heating means 28, and/or to provide other disadvantages. This is not true when two apparatuses 16 are used face-to-face in the one pass position. Then, fabric element 12 is maintained substantially taut and planar against lateral deflection and flapping by the gas streams since this deflection and flapping is minimized by having the gas discharge means in each apparatus 16, including the two gas streams 42, symmetrically straddling element 12, and by having rolls 23 and 24 suitably driven to exert sufficient tension on element 12 between rolls 23 and 24.

There are other advantages in having two apparatuses 16 facing each other at each tier, such as tier T3 in FIG. 1, with one apparatus 16 in each bank B1 and B2. Then, these two heating apparatuses 16 are mounted with their two heating zones 40 having sandwiched therebetween the generally coinciding opposite faces F1 and F2 of element 12 so that each dries one of the opposite generally coinciding parallel faces of element 12. This structural arrangement and coaction has a higher heating or drying heat; simultaneously heats or dries both sides of fabric element 12; more rapidly heats or dries fabric element 12; and requires no reflector (such as center wall 76 in FIGS. 1, 2 and 7) behind element 12, such as would be necessary if only one drying apparatus in a one-pass position or if a two pass position were used. Such reflector may have a short useful wear life if it gets tarnished or tends to melt under the hot infrared radiation heat.

Both single-pass and two-pass positions have certain advantages. Eight apparatuses 16 in bank B1 in FIG. 1 in tiers T1–T8 arranged in series along direction T of travel of element 12 have certain advantages. Each of these apparatuses 16 has its own gas discharge nozzle 50 and gas exhaust opening 56 for generally uniformly processing width W of element 12 in series arranged heating zones 40 as element 12 moves upwardly in FIG. 1 past these 8 series arranged apparatuses 16 in bank B1. Each of these 8 drying apparatuses has its own vertically traveling gas stream 42 formed from relatively fresh, dry, cool air at ambient conditions sucked in from outside drying tower 14 for its discharge nozzle 50 and has water molecule saturated, or at least heavily laden, air (substantially raised in temperature) exhausted through exhaust fan 60 by outlet duct 58 at the top of drying tower 14 so as to not interfere with the flow of fresh, dry air into tower 14 for discharge nozzles 50. Having eight separate, vertically arranged, gas streams 42 is a substantial advantage over having a single gas stream 42 passing from the bottom to the top of tower 14. This single gas stream would (after it traveled more than one tier in height) be too heavily laden with water molecules to provide an effective scrubbing action for removal of evaporated water, be too heated up to provide an effective temperature control by cooling element 12, be too heavily concentrated with water molecules so as to prevent effective infrared transmission from heaters 32 to element 12, have lost its upward velocity so it would no longer scrub off the water molecules or remove the convection heat, not be able to be kept confined to surface F1 or F2 of fabric element 12 because it would lose its upward velocity, and not be able to be confined to a compact stream but would spread laterally and thus be totally useless. The advantage of dividing a single gas stream into eight separate series arranged gas streams 42 becomes more apparent when one realizes that the free vertical travel of each gas stream 42 at each tier in FIG. 1 may be generally about eight feet vertically in the typical installation while a single stream may have to travel about 100 feet traveling the vertical heights of drying tower 14. Also, it is possible by using the sixteen separate drying apparatuses 16 in drying tower 14, arranged in horizontally opposed pairs and in eight series arranged pairs, separately to control the infrared heating action and flow of gas stream 42 in each component apparatus 16 to match the existing and desired conditions of temperature and moisture removal from element 12 as it is progressively heated or dried as it moves through tower 14. This would not be possible if a single gas stream were used for the whole height of tower 14. Also, it has been found during operation of tower 14 that the temperature of element 12 and the temperature of the discharged air at the top of each tier T1–T8 can be controlled to be approximately the same even though element 12 becomes progressively drier as it moves through tower 14.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An apparatus for heating fibers in yarn or fabric in a continuous length element comprising:

a. a plurality of gas-fired heaters for emitting infrared radiation;

b. means for moving a fiber element in heat exchange relation successively past the heaters;

c. a shutter associated with each heater and disposed between each heater and fiber element during normal operation of the heater for heating said element, each shutter having an aperture;

d. a plurality of slats mounted in the aperture of each shutter for rotation about parallel axes; and e. means, responsive to movement of the fiber element in relation to the heaters, for rotating the slats of each shutter.

2. The apparatus of claim 1, which includes means, responsive to rotation of the slats of a shutter to a closed position where the slats are in aligned relation parallel to the plane of said shutter, for moving a heater associated with said shutter in a direction away from said shutter.

3. The apparatus of claim 2, which includes means, responsive to closure of a shutter, for shutting off gas to a heater associated with said shutter.

4. The apparatus of claim 1, wherein the means (*e*) includes means for maintaining the slats of each shutter in a fully open position where the slats of each shutter are in parallel planes angularly disposed to the plane of the shutter when the fiber element is moving past the heaters.

5. The apparatus of claim 1, which includes means for discharging gas, under pressure, into the space between the fiber element and each shutter.

6. The apparatus of claim 5, wherein the gas is discharged into the spaces in contacting, parallel relation to the fiber element.

7. The apparatus of claim 6, wherein the gas is discharged at a rate sufficient to adversely affect normal operation of the heaters.

8. The apparatus of claim 1, wherein the means (*e*) includes means for rotating the slats of each shutter to a closed position, when the fiber element stops moving.

9. The apparatus of claim 8, wherein the means (*e*) includes means for maintaining the slats of each shutter in a fully open position where the slats of each shutter are in parallel planes angularly disposed to the plane of the shutter, when the fiber element is moving past the heaters.

10. The apparatus of claim 9, which includes means for shutting off gas to a heater when the slats of a shutter associated with said heater are in a closed position; and means for moving a heater in a direction away from a shutter associated with said heater, when the slats of said shutter are in a closed position.

* * * * *

UNITED STATES PATENT OFFICE
CERTIFICATE OF CORRECTION

Patent No. 3,643,342          Dated February 22, 1972

Inventor(s) David Z Tyson, Edward E Hunter, Willie Herman Best

It is certified that error appears in the above-identified patent and that said Letters Patent are hereby corrected as shown below:

Col. 2, line 8, "therefore" should read -- therefor --.
           33, "therefore" should read -- therefor --.

Col. 4, line 49, "18" should read -- 28 --.

Col. 5, line 15, "18" should read -- 28 --.

Col. 9, line 24, "54" should read -- 65 --.

Col. 10, line 2, "62c" should read -- 62o --.
           16, "4" should read -- 40 --.
           26, "62c" should read -- 62o --.

Col. 12, line 37, "62c" should read -- 62o --.
           57, "62c" should read -- 62o --.

Col. 14, line 25, "15f" should read -- 115f --.
           69, "eliminate" should read -- element --.

Col. 19, line 14, "c" should read -- 65c --.

Signed and sealed this 29th day of August 1972.

(SEAL)
Attest:

EDWARD M.FLETCHER,JR.
Attesting Officer

ROBERT GOTTSCHALK
Commissioner of Patent